(12) United States Patent
Kitajima (10) Patent No.: US 7,500,631 B2
(45) Date of Patent: Mar. 10, 2009

(54) GEAR MOUNTING STRUCTURE FOR FISHING REEL

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/640,177

(22) Filed: Dec. 18, 2006

(65) Prior Publication Data

US 2007/0181727 A1 Aug. 9, 2007

(30) Foreign Application Priority Data

Jan. 20, 2006 (JP) .............................. 2006-012885

(51) Int. Cl.
*A01K 89/01* (2006.01)
(52) U.S. Cl. ...................... 242/242; 242/279
(58) Field of Classification Search ................ 242/241, 242/242, 273–279; 74/216.3, 25, 56; 464/182; 403/1, 291, 361
See application file for complete search history.

(56) References Cited

U.S. PATENT DOCUMENTS

| 2,338,126 | A | * | 1/1944 | Maynes | 242/274 |
| 2,523,134 | A | | 9/1950 | Maynes | |
| 2,848,884 | A | * | 8/1958 | Maude | 464/30 |
| 4,638,528 | A | * | 1/1987 | Omata | 16/82 |
| 4,807,827 | A | * | 2/1989 | Welch | 242/279 |
| 5,249,760 | A | | 10/1993 | Morimoto | |
| 5,269,397 | A | * | 12/1993 | Kawamoto et al. | 188/290 |
| 5,308,017 | A | | 5/1994 | Yoshikawa | |
| 5,575,431 | A | | 11/1996 | Henriksson | |
| 6,830,209 | B1 | * | 12/2004 | Baenziger et al. | 242/278 |
| 6,857,587 | B2 | * | 2/2005 | Chin | 242/241 |
| 7,077,351 | B2 | * | 7/2006 | Myojo et al. | 242/310 |
| 2003/0197081 | A1 | * | 10/2003 | Chin | 242/242 |

FOREIGN PATENT DOCUMENTS

JP      2000-023600 A      1/2000

OTHER PUBLICATIONS

Fixed. (2003). In The American Heritage® Dictionary of the English Language. Retrieved Nov. 1, 2007, from http://www.credoreference.com/entry/4087841.*

* cited by examiner

*Primary Examiner*—Emmanuel M Marcelo
(74) *Attorney, Agent, or Firm*—Shinjyu Global IP (57) ABSTRACT

A gear mounting structure for a fishing reel includes a screw shaft, a gear component and a ring member. The screw shaft has a shaft body, a spiral groove and a mounting part provided at an end of the shaft body. The spiral groove has a crossing point on an exterior circumference of the shaft body. The gear component has a gear body, a plurality of gear teeth and a mounting cavity. The gear teeth are formed in a circumferential direction along an exterior circumference of the gear body. The mounting cavity is for non-rotatably mounting the mounting part. The ring member has an elastic body interposed between the mounting part and the mounting cavity.

20 Claims, 6 Drawing Sheets

GEAR MOUNTING STRUCTURE FOR FISHING REEL

CROSS-REFERENCE TO RELATED APPLICATIONS

This application claims priority under 35 U.S.C. § 119 to Japanese Patent Application No. 2006-012885 filed on Jan. 20, 2006. The entire disclosure of Japanese Patent Application No. 2006-012885 is hereby incorporated herein by reference.

BACKGROUND OF THE INVENTION

1. Field of the Invention

The present invention generally relates to a gear mounting structure. More specifically, the present invention relates to a gear mounting structure for mounting a shaft to a gear in a reciprocating movement mechanism of a fishing reel.

2. Background Information

Fishing reels mainly include spinning reels and dual bearing reels. This type of fishing reel has a reel main body mounted on a fishing rod and a spool provided in the reel main body to wind fishing line. In dual bearing reels, the spool is supported on the reel main body so as to be freely rotatable. The spool is provided with a level winding mechanism for evenly winding the fishing line onto the spool. In spinning reels, an oscillating mechanism is provided on the reel main body so as to move freely front-to-back in order to evenly wind the fishing line onto the spool.

The level winding mechanism in the dual bearing reel is provided with a screw shaft disposed parallel with a spool shaft installed in the spool, a linkage mechanism for rotating the screw shaft, and a fishing line guide that connects with a spiral groove formed in the screw shaft so as to reciprocatingly guide the fishing line (for example, refer to Japanese Laid-Open Patent Publication No. 2000-23600). The oscillating mechanism of the spinning reel is provided with a linkage mechanism for rotation of a handle, a screw shaft that rotates by a linkage mechanism disposed parallel with a spool shaft, and a slider connected to the screw shaft and capable of reciprocating movement with the spool shaft in a screw shaft direction. A fishing line is evenly wound on the spool by the rotation of the screw shaft via the rotation of the handle, and the reciprocating movement of the slider and the fishing line guide. The linkage mechanism has gear components provided to transfer the rotation of the handle. The gears are installed on a leading end at one end of the screw shaft so as to be relatively non-rotational. Specifically, the cross section of the end of the screw shaft in the axial direction is formed in a non-circular shape. A non-circular through hole is formed so as to pass through a center of the gear. The end of the screw shaft engages the through hole of the gear component such that the screw shaft and the gear component are relatively non-rotational.

Since the gear components are installed on one end of the screw shaft so as to be relatively non-rotatable in conventional level winding mechanisms, the screw shaft can be rotated in linkage with the rotation of the handle. However, since only the end of the screw shaft engages the through hole of the gear, some instability is generated between the end of the screw shaft and the through hole of the gear. When the gears are rotated in conjunction with the rotation of the handle, and particularly when the rotational torque of the screw shaft changes as the fishing line guide part and slider reverse direction at the end positions of the screw shaft, there is an increased instability between the end of the screw shaft and the through hole of the gear so as to cause a concern about a decrease in sensitivity in the handle operation by the fisherman.

In view of the above, it will be apparent to those skilled in the art from this disclosure that there exists a need for an improved gear mounting structure that to suppress the decrease in sensitivity in the handle operation by the fisherman in a gear mounting structure. This invention addresses this need in the art as well as other needs, which will become apparent to those skilled in the art from this disclosure.

SUMMARY OF THE INVENTION

The gear mounting structure for a fishing reel of a first aspect of the present invention is a gear mounting structure for a reciprocating movement mechanism for a fishing reel that includes a screw shaft, a gear component and a ring member. The screw shaft has a shaft body, a spiral groove and a mounting part provided at an end of the shaft body. The spiral groove has a crossing point on an exterior circumference of the shaft body. The gear component has a gear body, a plurality of gear teeth and a mounting cavity. The gear teeth are formed in a circumferential direction along an exterior circumference of the gear body. The mounting cavity is for non-rotatably mounting the mounting part. The ring member has an elastic body interposed between the mounting part and the mounting cavity.

Since, in this gear mounting structure, a flexible ring member is interposed between the mounting cavity of the gear component and the mounting part of the screw shaft, instability is not produced between the mounting cavity of the gear component and the mounting part of the screw shaft when the mounting part is installed so as to be relatively non-rotational relative to the mounting cavity. Therefore, when the gear component is rotated in conjunction with the rotation of the handle, and particularly when the rotational torque of the screw shaft changes as the fishing line guide part and slider turn back at the bilateral end positions of the screw shaft, the fisherman is able to operate the handle smoothly because there is no instability between the mounting cavity of the gear component and the mounting part of the screw shaft due to the installation of the flexible ring member. Thus, there is no loss of sensitivity related to the operation of the handle by the fisherman.

The gear mounting structure pertaining to a second aspect of the present invention is the gear mounting structure according to the first aspect of the present invention, wherein the screw shaft has a mounting channel formed at an exterior circumference of the mounting part for mounting the ring member. In this case, the ring member is easily positioned and locked in place by the mounting groove.

The gear mounting structure pertaining to a third aspect of the present invention is the gear mounting structure according to the first or second aspect of the present invention, wherein the screw shaft has a connecting part formed at a leading end of the mounting part and the connecting part has a non-circular cross section. The gear component further has a connecting cavity for engaging the connecting part. The connecting cavity has a smaller diameter on a leading end side of the mounting cavity than a diameter on an opposite end of the mounting cavity. In this case, the mounting part is mounted so as to be relatively non-rotatable relative to the mounting cavity using a simple structure by having the non-circular connecting part engage the non-circular connecting cavity.

The gear mounting structure pertaining to a fourth aspect of the present invention is the gear mounting structure according to any of the first through third aspects of the present invention, wherein the mounting part is formed with a circular cross section in an axial direction. The mounting cavity is formed with a circular cross section in a mounting direction of the mounting part that is slightly larger in diameter than the mounting part. In this case, when, for example, the mounting part and the mounting cavity have circularities of such dimensions as to allow insertion, a high degree of concentricity can be maintained since the screw shaft and gear component can be centered via a simple structure.

The gear mounting structure pertaining to a fifth aspect of the present invention is the gear mounting structure according to any of the first through fourth aspects of the present invention, wherein the ring member includes an O-ring. In this case, an inexpensive ring member is offered with an O-ring.

The gear mounting structure pertaining to a sixth aspect of the present invention is the gear mounting structure according to any of the first through fifth aspects of the present invention, wherein the reciprocating movement mechanism of the fishing reel includes an oscillating mechanism of a spinning reel for moving a spool shaft forward and back. In this case, in the spinning reel oscillating mechanism, there is no loss of sensitivity related to the operation of the handle by the fisherman.

The gear mounting structure pertaining to a seventh aspect of the present invention is the gear mounting structure according to any of the first through fifth aspects of the present invention, wherein the reciprocating movement mechanism of a fishing reel includes a level winding mechanism for evenly winding a fishing line on a spool of the fishing reel. In this case, in the level winding mechanism of a dual bearing reel, there is no loss of sensitivity related to the operation of the handle by the fisherman.

Accordingly, the present invention provides a gear mounting structure capable of suppressing a decrease in sensitivity related to the operation of the handle by a fisherman by installing a flexible ring member between the mounting part of a screw shaft and the mounting cavity of the gear component.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
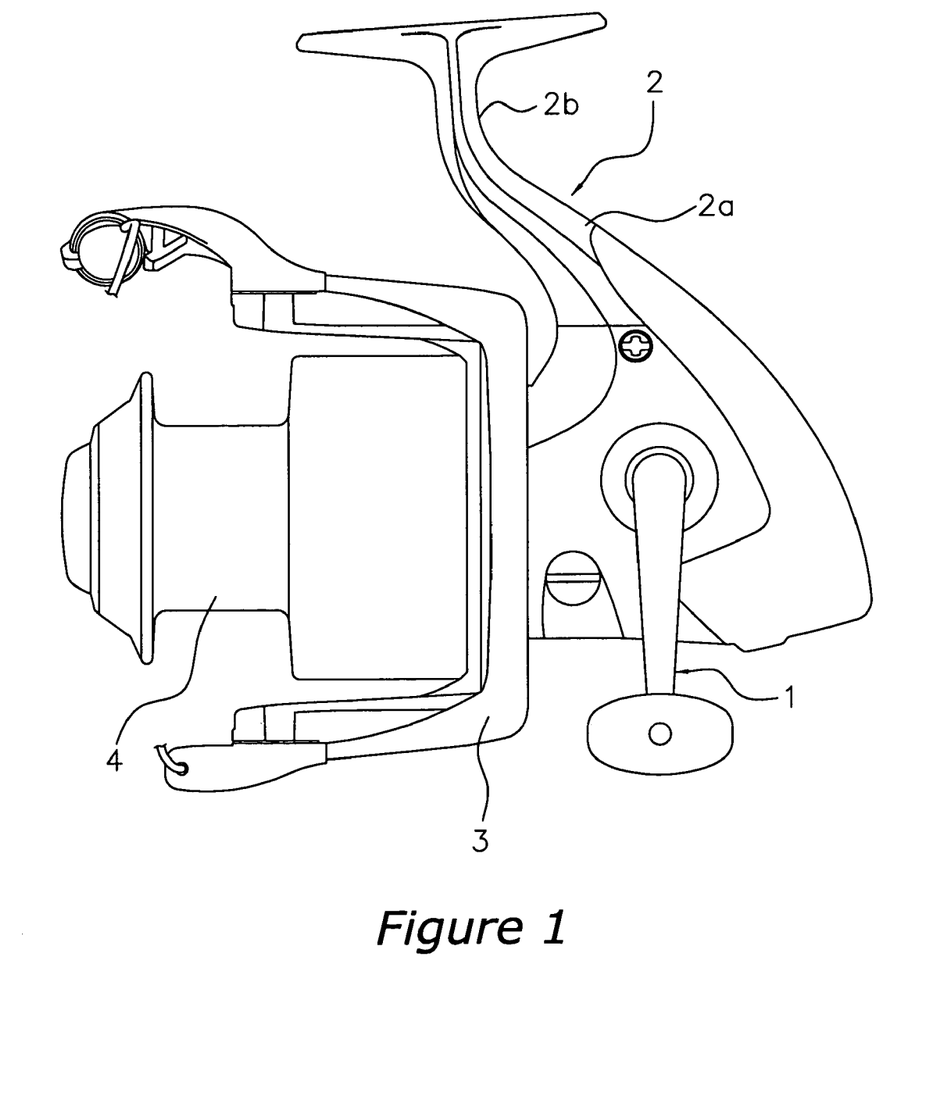
FIG. 1 is a left side view of a spinning reel equipped with a gear mounting structure in accordance with a first embodiment of the present invention.

Referring initially to FIG. 1, a spinning reel is illustrated in accordance with a first embodiment of the present invention. The spinning reel includes a reel main body 2, a rotor 3 and a spool 4. The reel main body 2 rotatably supports a handle 1. The rotor 3 is rotatably supported on a front of the reel main body 2. The spool 4 accommodates fishing line that is wound around an exterior circumference of the spool 4. The spool 4 is disposed on a front part of the rotor 3 so as to be movable back and forth.

Figure 2:
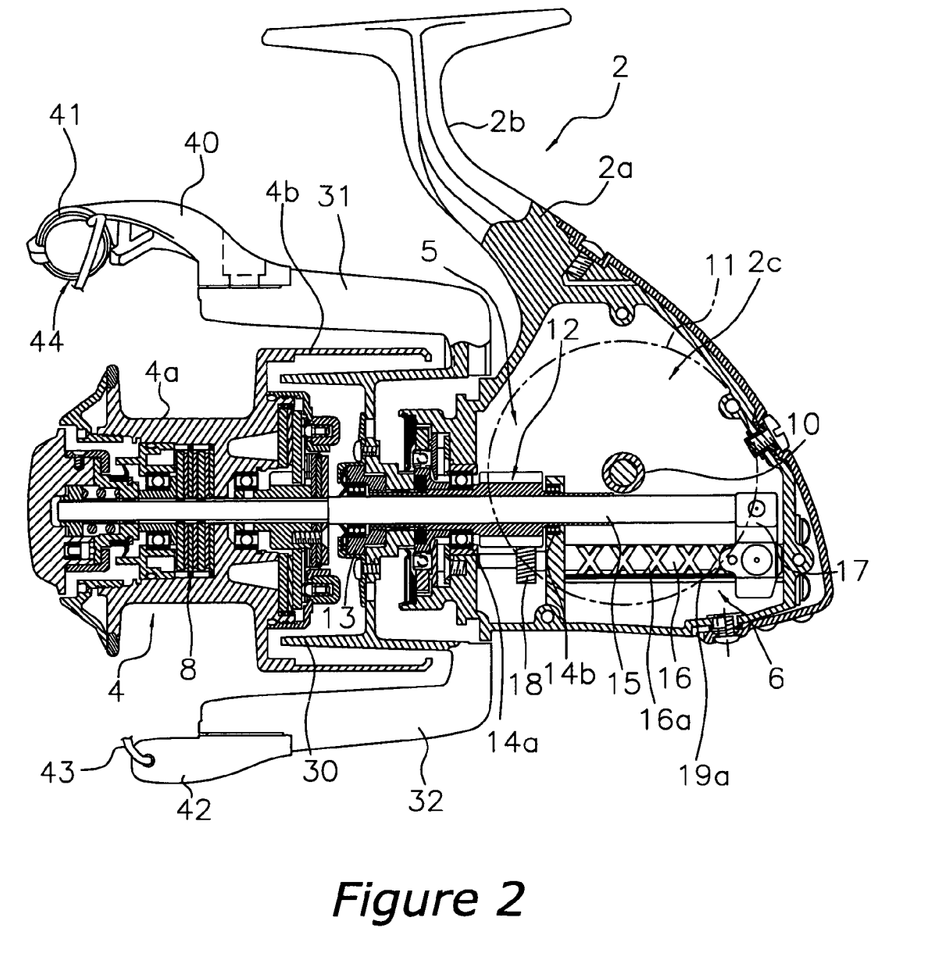
FIG. 2 is a partial cross sectional view of the spinning reel of FIG. 1 equipped with the gear mounting structure in accordance with the first embodiment of the present invention.

Referring to FIG. 2, the reel main body 2 has a reel body 2a, a rod mounting arm 2b and a housing space 2c. The rod mounting arm 2b extends at an inclination upward and forward from the reel body 2a. The housing space 2c is provided internally in the reel body 2a. The housing space 2c accommodates a rotor drive mechanism 5 and a reciprocating movement mechanism that includes an oscillating mechanism 6. The rotor drive mechanism 5 is for rotating the rotor 3 in linkage with the rotation of the handle 1. The oscillating mechanism 6 is for uniformly winding the fishing line by moving the spool 4 back and forth.

The rotor 3 has a round barrel 30, a first rotor arm 31 and a second rotor arm 32. The first and second rotor arms 31 and 32 are alternately opposed at the sides of the barrel 30, as shown in FIG. 2. The barrel 30, the first rotor arm 31 and the second rotor arm 32 are integrally formed of, for example, an aluminum alloy.

The first rotor arm 31 is curved convexly outward and extends forward from the barrel 30. A connecting part connected to the barrel 30 is broadly curved in a circumferential direction of the barrel 30. The first rotor arm 31 has a first bail support 40 and a line roller 41 on an outer circumference side at a tip of the first rotor arm 31. The first bail support 40 is configured and arranged to be able to oscillate. The line roller 41 guides the fishing line to the spool 4.

The second rotor arm 32 is curved convexly outward and extends forward from the barrel 30. The second rotor arm 32 has a second bail support 42 on an outer circumference side at a tip of the second rotor arm 32. The second bail support 42 is configured and arranged to be able to oscillate.

A bail 43 is fixedly attached between the line roller 41 and the second bail support 42. The bail 43 is formed of a wire having a curvature approximating an U-shape. A bail arm 44, for guiding the fishing line to the spool 4, is constituted by the first bail support 40, the second bail support 42, the line roller 41, and the bail 43. The bail arm 44 is configured and arranged to oscillate between a line guiding position shown in FIG. 2 and a reverse line release position.

The spool 4 is disposed between the first rotor arm 31 and the second rotor arm 32 of the rotor 3, as shown in FIG. 2. The spool 4 is a large-and-small, two-stage, barrel-like member. The spool 4 is obtained by forging, for example, an aluminum alloy. The spool 4 has a small diameter, barrel-like line winding cylinder 4a and a large diameter, barrel-like skirt 4b. The fishing line is wound on an outer circumference of the line winding cylinder 4a. The skirt 4b is integrally formed at a rear of the line winding cylinder 4a.

As shown in FIG. 2, the rotor drive mechanism 5 has a face gear 11 and a pinion gear 12. The face gear 11 rotates together with a handle shaft 10 connected to the handle 1. The pinion gear 12 engages the face gear 11. The pinion gear 12 is formed in a barrel shape. A front part of the pinion gear 12 passes through a center of the rotor 3 and is fixed to the rotor 3 by a nut 13. A center part and a rear end part of the pinion gear 12 in an axial direction are rotatably supported, via bearings 14a and 14b, by the reel main body 2. A parallel bevel of predetermined length is formed on the front part of the pinion gear 12. The bevel of the pinion gear 12 is provided to link the rotor 3 to the pinion gear 12 in order to prevent rotation.

A spool shaft 15 is connected to a center of the spool 4 through a drag mechanism 8, as shown in FIG. 2. The oscillating mechanism 6 moves the spool shaft 15 back and forth and thus, moves the spool 4 in the same direction. The oscillating mechanism 6 includes a screw shaft 16, a slider 17, an intermediate gear 18, a guide shaft 19a and a flexible ring member 20. The screw shaft 16 has a spiral groove 16a formed on an exterior circumference of the screw shaft 16. The screw shaft 16 is disposed parallel to and below the spool shaft 15. The slider 17 moves in the back and forth directions along the spiral groove 16a. The intermediate gear 18 is fixedly attached to a leading end of the screw shaft 16. Preferably, two guide shafts 19a are disposed parallel to the screw shaft 16 (only one guide shaft 19a is shown in FIG. 2). The slider 17 is installed on the guide shafts 19a so as to be movable. The flexible ring member 20 is provided between the screw shaft 16 and the intermediate gear 18. A rear end of the spool shaft 15 is non-rotatably attached to the slider 17. The intermediate gear 18 rotates in conjunction with the rotor drive mechanism 5 and engages the pinion gear 12 via a transmission mechanism (not shown). The transmission mechanism slows the back and forth movement of the oscillating mechanism 6 in order to realize accurate winding of the fishing line onto the spool 4.

Figure 3:
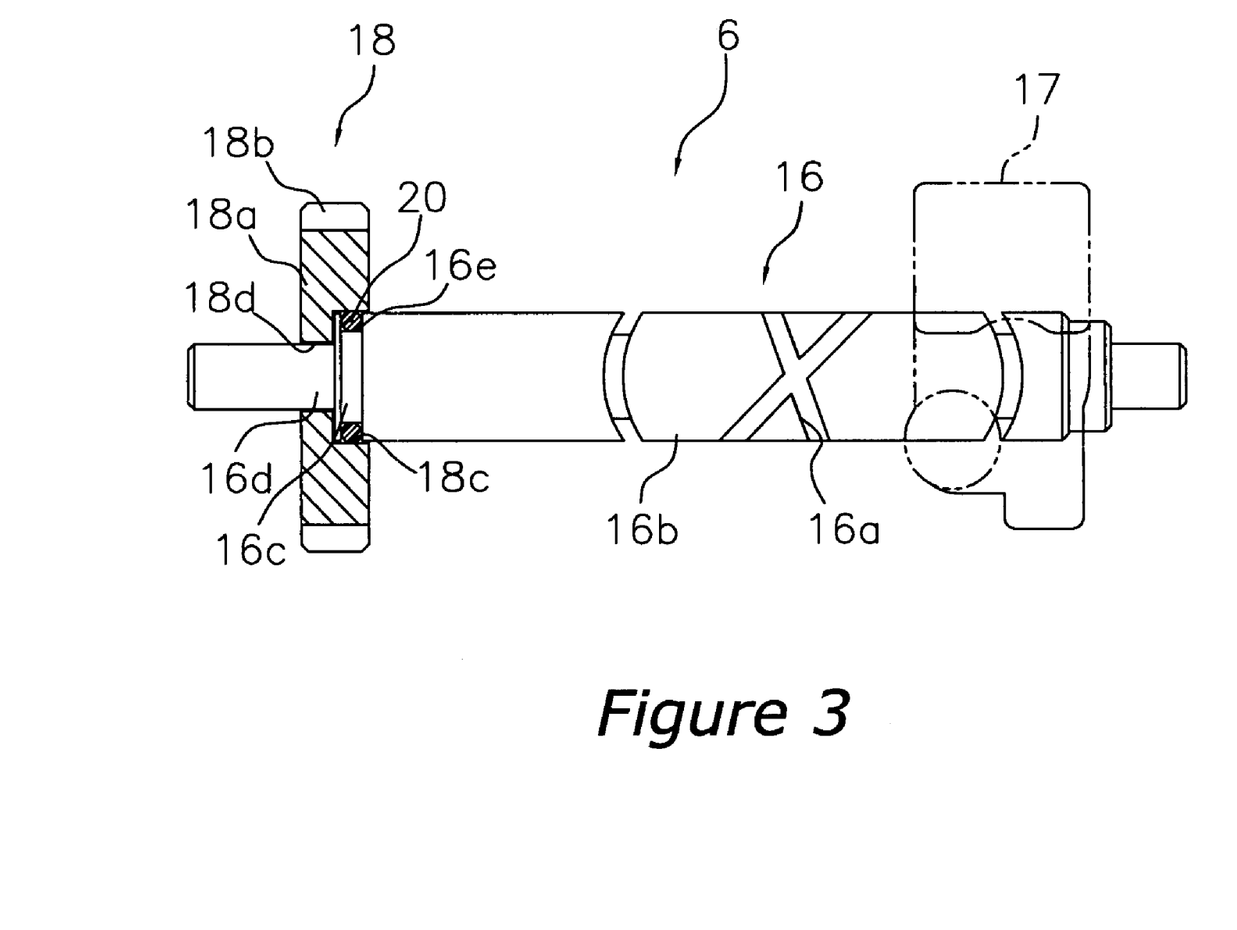
FIG. 3 is an enlarged section view and partial cross section of the gear mounting structure in accordance with the first embodiment of the present invention.

Referring to FIG. 3, the screw shaft 16 includes a shaft body 16b, a mounting part 16c, a connecting part 16d and a mounting channel 16e. The spiral groove 16a is formed so that both ends are connected so as to intersect on the exterior circumference of the shaft body 16b. The mounting part 16c is provided at a leading end (the left end as shown in FIGS. 2 and 3) of the shaft body 16b. The connecting part 16d is formed at a leading end of the mounting part 16c and has a small diameter with a non-circular cross section in the axial direction. The mounting channel 16e is a recessed portion at an exterior circumference of the mounting part 16c for installing the ring member 20. The shaft body 16b is a cylindrical shaft extending in the back and forth direction. The leading and rear ends of the shaft body 16b are supported by front and rear walls, respectively, of the reel body 2a. The front and rear walls of the reel body 2a are disposed within the reel body 2a at a rear portion of the reel body 2a. The mounting part 16c has a circular cross section in the axial direction. The connecting part 16d at the leading end of the mounting part 16c has a substantially ovoid cross section. The mounting channel 16e is an annular channel having a depth slightly less than a thickness of the ring member 20. Accordingly, when the ring member 20 is installed, an exterior circumference of the ring member 20 protrudes outward beyond an outer diameter of the mounting channel 16e.

An interior of the slider 17 has a connecting member (not shown) that engages the spiral groove 16a, so as to reciprocate the slider 17 back and forth in the axial direction via the rotation of the screw shaft 16. The slider 17 is non-rotatably attached to the rear end of the spool shaft 15. The slider 17 is guided in the back and forth direction by the two guide shafts 19a.

As shown in FIG. 3, the intermediate gear 18 is provided with a gear main body 18a, a plurality of gear teeth 18b, a mounting cavity 18c and a connecting cavity 18d. The connecting cavity 18d engages the connecting part 16d. The connecting cavity 18d is formed with a smaller diameter at a leading end of the mounting cavity 18c. The gear teeth 18b are formed in a circumferential direction along an outer circumference of the gear main body 18a. The mounting cavity 18c is formed in an inner circumference of the gear main body 18a for the purpose of non-rotatably mounting the mounting part 16c. The mounting cavity 18c has a circular cross section and circular dimensions that allow engagement between the mounting cavity 18c and the mounting part 16c. The mounting cavity 18c has a diameter larger than a diameter of the mounting part 16c and slightly larger than a diameter of the shaft body 16b. The connecting cavity 18d is formed with an ellipse shape cross section and the connecting part 16d is installed therein so as to be non-rotatable.

The ring member 20 is an elastic O-ring disposed between the mounting part 16c and the mounting cavity 18c. The ring member 20 is an O-ring made of synthetic rubber that has an elasticity, such as nitrile rubber (NBR), styrene-butadiene rubber (SBR) and the like. The ring member 20 is elastically installed in the mounting channel 16e. The outer circumferential surface of the ring member 20 contacts the inner circumferential surface of the mounting cavity 18c with an elastic force. Thus, instability between the mounting part 16c and the mounting cavity 18c is prevented.

The functioning and operation of the spinning reel is described below. When casting, the bail arm 44 first reverts to the line release position. Thus, the first bail support 40 and the second bail support 42 oscillate. In this state, the fishing rod is cast and the fishing line is held by the index finger of the hand gripping the fishing rod. The fishing line is then released with sufficient force via its own weight. In this state, when the handle 1 is rotated in the line-winding direction, the rotor 3 is rotated in the line-winding direction via the rotor drive mechanism 5. The bail arm 44 returns to the line-guiding position via a bail reverting mechanism (not shown) and the fishing line is wound on the spool 4. At this time, the spool 4 is moved back and forth by the oscillating mechanism 6 connected to the rotor drive mechanism 5 so that the fishing line is evenly taken up. Specifically, the rotation of the pinion gear 12 of the rotor drive mechanism 5 is transmitted to the intermediate gear 18 through the transmission mechanism (not shown) of the oscillating mechanism 6. When the intermediate gear 18 is rotated, the screw shaft 16, which is non-rotatably installed on the intermediate gear 18, is also rotated and the slider 17 is moved in the back and forth direction. Thus, the spool shaft 15, which is attached to the slider 17, is moved in the back and forth direction and the spool 4, which is attached to the spool shaft 15, is moved in the back and forth direction.

Since a flexible ring member 20 is installed between the mounting part 16c of the screw shaft 16 and the mounting cavity 18c of the intermediate gear 18, instability between the mounting part 16c and the mounting cavity 18c is prevented because the mounting part 16c is non-rotatably mounted in the mounting cavity 18c. Therefore, when the intermediate gear 18 is rotated in conjunction with the rotation of the handle 1, and particularly when the rotational torque of the screw shaft 16 changes as the slider 17 reverses direction at the end positions of the screw shaft 16, the fisherman is able to smoothly operate the handle 1 because there is no instability between the mounting cavity 18c and the mounting part 16c due to the installation of the flexible ring member 20. Thus, there is no loss of sensitivity in the operation of the handle 1 by the fisherman.

In a conventional structure, both a screw shaft and an intermediate gear are caulk-anchored or adhesive-anchored to limit instability. In which case, assembly becomes difficult; particularly in the case of a reciprocating movement mechanism in the form of an oscillating mechanism of a spinning reel. Moreover, when the screw shaft and the intermediate gear are caulk-anchored, there is a possibility of inaccurate concentricity and/or perpendicularity. In contrast, in the structure of the present invention, neither component is caulk-anchored since the flexible ring member 20 is installed between the mounting part 16c of the screw shaft 16 and the mounting cavity 18c of the intermediate gear 18. Therefore, difficulty in assembling the screw shaft 16 and the intermediate gear 18 and inaccuracy in concentricity and perpendicularity are eliminated.

Second Embodiment

Figure 4:
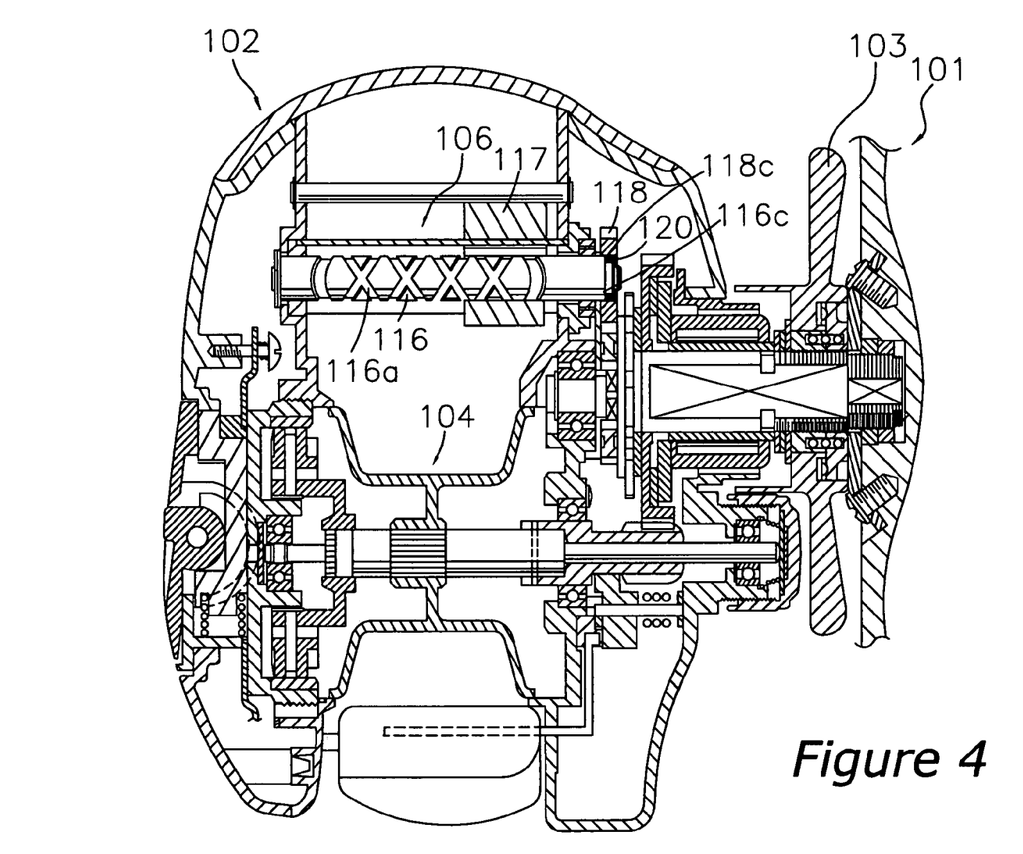
FIG. 4 is a top partial cross sectional view of a dual bearing reel equipped with a gear mounting structure in accordance with a second embodiment of the present invention.

Referring now to FIG. 4, a gear mounting structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Although the spinning reel oscillating mechanism is used as an example in the first embodiment, the present invention is also applicable to the level winding mechanism of dual bearing reels.

Referring to FIG. 4, the second embodiment of the present invention is applied to a dual bearing reel. The dual bearing reel includes a reel main body 102, a spool rotating handle 101 and a drag adjusting stay drag 103. The spool rotating handle 101 is disposed on a side of the reel main body 102. The drag adjusting stay drag 103 is disposed on the same side of the reel main body 102 as the handle 101. Within the reel main body 102 a housing space is provided. The housing space has a spool 104 and a reciprocating movement mechanism that includes a level winding mechanism 106 for evenly winding a fishing line onto the spool 104. Furthermore, a gear member 118 is disposed within the housing space on a right side of the reel main body 102 for transmitting a rotational force of the handle 101 to the spool 104 and the level winding mechanism 106.

The level winding mechanism 106 has a screw shaft 116 and a fishing line guide 117. The fishing line guide 117 is for guiding the fishing line by reciprocating in a spool axis direction along the screw shaft 116. The screw shaft 116 includes a spiral groove 116a intersecting on an exterior surface of the screw shaft 116. Both ends of the screw shaft 116 are rotatably supported by bilateral panels of the reel main body 102. The gear member 118 is mounted on a right end of the screw shaft 116. The rotation of the handle 101 is transmitted to the screw shaft 116 through the gear member 118. A flexible ring member 120 is disposed between a mounting part 116c of the screw shaft 116 and a mounting cavity 118c of the gear member 118 when the mounting part 116c is non-rotatably positioned in the mounting cavity 118c. The specific configuration of the screw shaft 116, the gear member 118, and the ring member 120 is identical to the screw shaft 16, the intermediate gear 18, and the ring member 20 of the first embodiment, and further description is therefore omitted.

Since, in this dual bearing reel, the flexible ring member 120 is installed between the mounting part 116c of the screw shaft 116 and the mounting cavity 118c of the gear member 118, instability between the mounting part 116c and the mounting cavity 118c is prevented. Therefore, when the gear member 118 is rotated in conjunction with the rotation of the handle 101, and particularly when the rotational torque of the screw shaft 116 changes as the fishing line guide 117 reverses direction at the end positions of the screw shaft 116, the fisherman is able to smoothly operate the handle 101 because instability between the mounting cavity 118c and the mounting part 116c is prevented due to the installation of the flexible ring member 120. Thus, there is no loss of sensitivity in the operation of the handle 101 by the fisherman.

Third Embodiment

Figure 5:
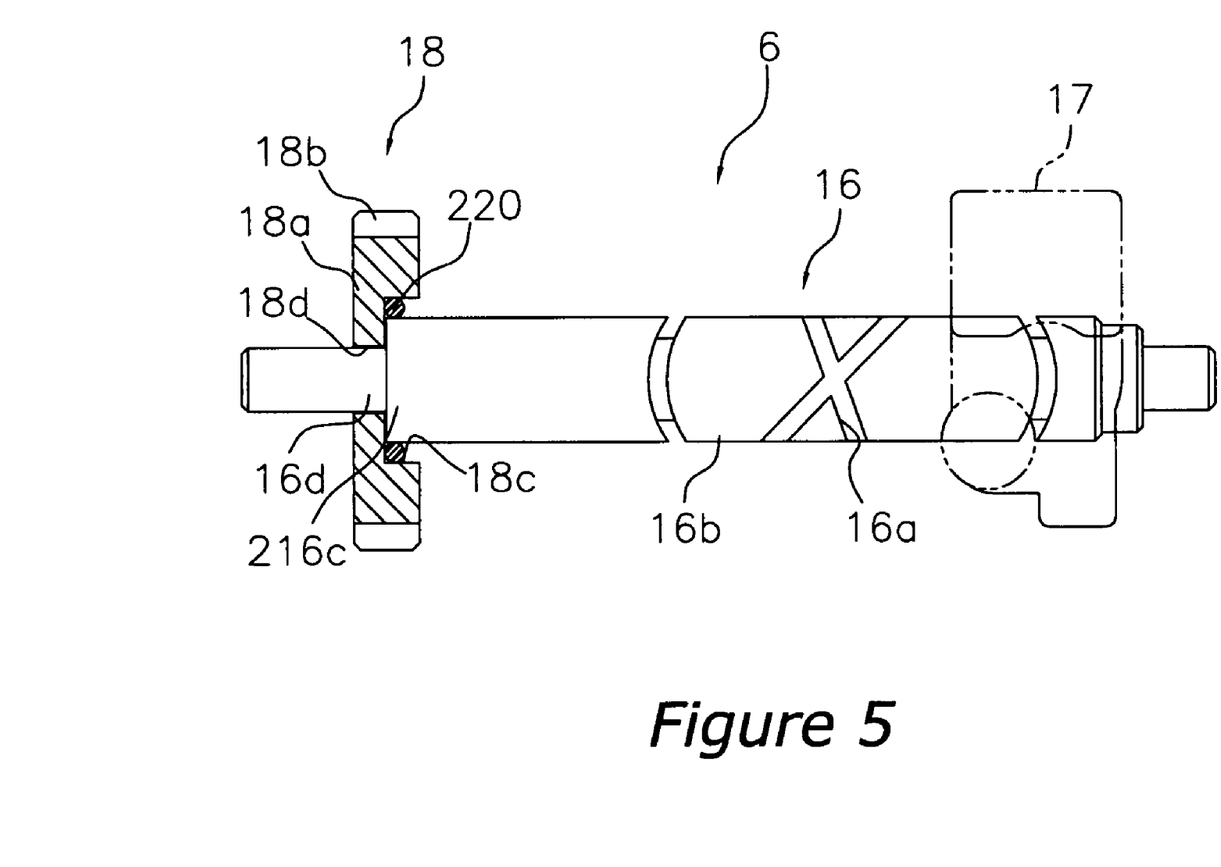
FIG. 5 is an enlarged section view and partial cross section of a gear mounting structure in accordance with a third embodiment of the present invention.

Referring now to FIG. 5, a gear mounting structure in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the first embodiment, the mounting channel 16e for installing the ring member 20 is formed on the screw shaft 16. In the third embodiment, the mounting channel 16e is omitted as shown in FIG. 5. A mounting part 216c for a flexible ring member 220 has an outer diameter that is the same as the outer diameter of the shaft body 16b.

Fourth Embodiment

Figure 6:
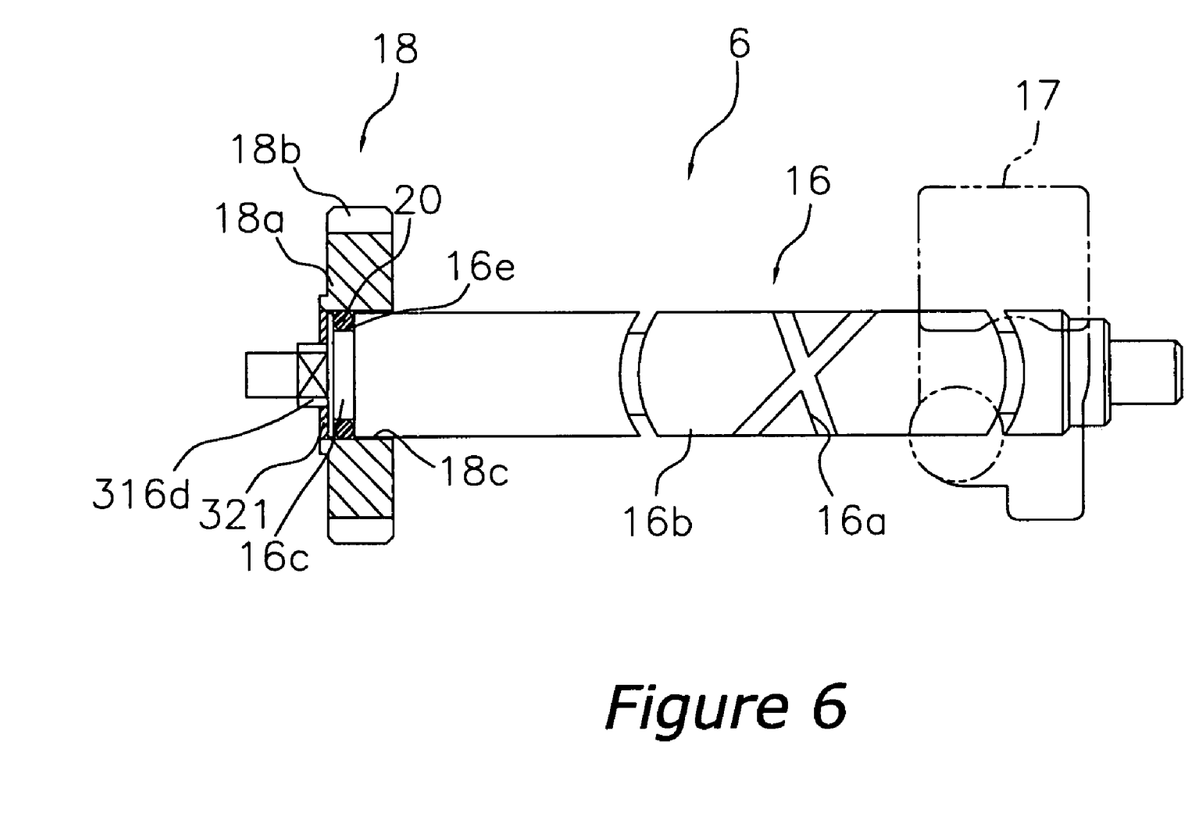
FIG. 6 is an enlarged section view and partial cross section of the gear mounting structure in accordance with a fourth embodiment of the present invention.

Referring now to FIG. 6, a gear mounting structure in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the first embodiment, the connecting cavity 18d having a non-circular cross section in the axial direction is formed on the intermediate gear 18 so that the intermediate gear 18 and the screw shaft 16 are non-rotational when the connecting part 16d engages the connecting cavity 18d. In the fourth embodiment, the connecting cavity 18d is omitted and the intermediate gear 18 and the screw shaft 16 are rendered non-rotational by a baffle washer 321 provided separate from the intermediate gear 18, as shown in FIG. 6.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A gear mounting structure for a reciprocating movement mechanism for a fishing reel comprising:
   a screw shaft having a shaft body, a spiral groove, a connecting part, and a mounting part, the mounting part being provided at an end of the shaft body, the connecting part having a non-circular cross section and is formed at a leading end of the mounting part, the spiral groove having a crossing point on an exterior circumference of the shaft body;
   a gear component having a gear body, a plurality of gear teeth formed in a circumferential direction along an exterior circumference of the gear body, a connecting cavity having a non-circular cross section, and a mounting cavity; and
   a ring member having an elastic body interposed between the mounting part and the mounting cavity, the exterior circumference of the ring member being arranged to contact the inner circumference of the mounting cavity and the connecting part being fixed to and integrally rotatable with the connecting cavity so as to transfer rotation to the gear component.

2. The gear mounting structure according to claim 1, wherein
   the mounting part is formed with a circular cross section in an axial direction; and
   the mounting cavity is formed with a circular cross section and a diameter that is larger than a diameter of the shaft body.

3. The gear mounting structure according to claim 1, wherein the ring member includes an O-ring.

4. The gear mounting structure according to claim 1, wherein
   the reciprocating movement mechanism of the fishing reel includes a level winding mechanism, the level winding mechanism being configured to evenly wind a fishing line onto a spool of the fishing reel.

5. The gear mounting structure according to claim 1, wherein
   the connecting cavity has a smaller diameter adjacent to a leading end side of the mounting cavity than a diameter on an opposite end side thereof.

6. The gear mounting structure according to claim 1, wherein
   ends of the connecting part and the mounting part are formed together.

7. The gear mounting structure according to claim 1, wherein
   the inner circumference of the ring member is arranged to contact the outer circumference of the mounting part.

8. The gear mounting structure according to claim 1, wherein
   the screw shaft further has a mounting groove recessed within an exterior circumference of the mounting part, the ring member being disposed inside the mounting groove between a pair of axial abutments of the mounting groove.

9. A dual bearing reel comprising:
   a reel main body having a housing space;
   a spool rotatably disposed in the housing space;
   a handle disposed on a side of the reel main body to rotate the spool;
   a reciprocating movement mechanism disposed in the housing space, the reciprocating mechanism including a level winding mechanism, the level winding mechanism being configured to evenly wind a fishing line onto the spool; and
   a gear mounting structure configured for the reciprocating movement mechanism, the gear mounting structure including
      a screw shaft having a shaft body, a spiral groove having a crossing point on an exterior circumference of the shaft body, a connecting part, and a mounting part, the mounting part being provided at an end of the shaft body,
      a gear component having a gear body, a plurality of gear teeth formed in a circumferential direction along an exterior circumference of the gear body, a mounting cavity, and a connecting cavity formed contiguous to the mounting cavity, the mounting part being non-rotatably fixed to the mounting cavity, and
      a ring member having an elastic body interposed between the mounting part and the mounting cavity, the exterior circumference of the ring member being arranged to contact the inner circumference of the mounting cavity and the connecting part being fixed to and integrally rotatable with the connecting cavity so as to transfer rotation to the gear component.

10. The dual bearing reel according to claim 9, wherein
   the connecting part has a non-circular cross section and is formed at a leading end of the mounting part, and the connecting cavity has a non-circular cross section and a smaller diameter on a leading end side of the mounting cavity than a diameter on an opposite end.

11. The dual bearing reel according to claim 9, wherein
   the mounting part is formed with a circular cross section in an axial direction; and
   the mounting cavity is formed with a circular cross section and a diameter that is larger than a diameter of the shaft body.

12. The dual bearing reel according to claim 9, wherein the ring member includes an O-ring.

13. The dual bearing reel according to claim 9, wherein the inner circumference of the ring member is arranged to contact the outer circumference of the mounting part.

14. The gear mounting structure according to claim 9, wherein
   the screw shaft further has a mounting groove recessed within an exterior circumference of the mounting part, the ring member being disposed inside the mounting groove between a pair of axial abutments of the mounting groove.

15. A spinning reel comprising:
   a handle;
   a reel main body rotatably supporting the handle and having a housing space;
   a rotor rotatably supported on a front of the reel main body;
   a spool disposed at a front of the rotor so as to be movable;
   a reciprocating movement mechanism disposed in the housing space, the reciprocating mechanism including an oscillating mechanism, the oscillating mechanism being configured to uniformly wind a fishing line onto the spool by moving the spool; and a gear mounting structure configured for the reciprocating movement mechanism, the gear mounting structure including     a screw shaft having a shaft body, a spiral groove having a crossing point on an exterior circumference of the shaft body, a connecting part having a non-circular cross section, and a mounting part provided at an end of the shaft body,     a gear component having a gear body, a plurality of gear teeth formed in a circumferential direction along an exterior circumference of the gear body, a mounting cavity, and a connecting cavity having a non-circular cross section and formed contiguous to the mounting cavity, the mounting cavity being configured to non-rotatably mount the mounting part, and     a ring member having an elastic body interposed between the mounting part and the mounting cavity, wherein the exterior circumference of the ring member is arranged to contact the inner circumference of the mounting cavity and the connecting part is fixed to and integrally rotatable with the connecting cavity so as to transfer rotation to the gear component.

16. The spinning reel according to claim 15, wherein the connecting part is formed at a leading end of the mounting part, and the connecting cavity has a smaller diameter on a leading end side of the mounting cavity than a diameter on an opposite end.

17. The spinning reel according to claim 15, wherein the mounting part is formed with a circular cross section in an axial direction; and the mounting cavity is formed with a circular cross section and a diameter that is larger than a diameter of the shaft body.

18. The spinning reel according to claim 15, wherein the ring member includes an O-ring.

19. The spinning reel according to claim 15, wherein the inner circumference of the ring member is arranged to contact the outer circumference of the mounting part.

20. The gear mounting structure according to claim 15, wherein the screw shaft further has a mounting groove recessed within an exterior circumference of the mounting part, the ring member being disposed inside the mounting groove between a pair of axial abutments of the mounting groove.

* * * * *